United States Patent [19]

Sunada et al.

[11] 4,361,498

[45] * Nov. 30, 1982

[54] TITANIUM TRICHLORIDE CATALYTIC COMPONENT AND METHOD FOR HOMO- OR CO-POLYMERIZATION OF α-OLEFIN

[75] Inventors: Yoichi Sunada, Shinnanyo; Yoshikazu Takahashi, Hikari; Masaru Takitani, Shinnanyo, all of Japan

[73] Assignee: Toyo Stauffer Chemical Co., Ltd., Tokyo, Japan

[ * ] Notice: The portion of the term of this patent subsequent to Nov. 25, 1997, has been disclaimed.

[21] Appl. No.: 211,667

[22] Filed: Dec. 1, 1980

[30] Foreign Application Priority Data

Nov. 30, 1979 [JP]  Japan ................................. 54-155318

[51] Int. Cl.$^3$ .............................................. C08F 4/64
[52] U.S. Cl. ................................. 252/429 B; 526/142; 526/144
[58] Field of Search ..................................... 252/429 B

[56] References Cited

U.S. PATENT DOCUMENTS

| | | | |
|---|---|---|---|
| 3,825,524 | 7/1974 | Wada et al. ................. | 252/429 B X |
| 4,123,387 | 10/1978 | Shiga et al. .................... | 252/429 B |
| 4,222,894 | 9/1980 | Takahashi et al. ............. | 252/429 B |
| 4,235,745 | 11/1980 | Takahashi et al. ............. | 252/429 B |

FOREIGN PATENT DOCUMENTS

| | | |
|---|---|---|
| 51-76196 | 7/1976 | Japan . |
| 51-90998 | 8/1976 | Japan . |
| 51-94496 | 8/1976 | Japan . |
| 52-47594 | 4/1977 | Japan . |
| 52-115797 | 9/1977 | Japan . |
| 53-12796 | 2/1978 | Japan . |
| 53-124186 | 10/1978 | Japan . |
| 53-138487 | 12/1978 | Japan . |

*Primary Examiner*—Patrick Garvin
*Attorney, Agent, or Firm*—Armstrong, Nikaido, Marmelstein & Kubovcik

[57] ABSTRACT

A highly active titanium trichloride catalytic component to be used for polymerization of α-olefin has highly uniform particle size the mean value of which is adjustable to a desired value between 10 and 500μ; and a method for manufacturing an α-olefin polymer having extremely uniform particle diameter by using a catalyst which is prepared by combining the above stated catalytic component with an organo-aluminum compound. In the manufacture of the olefin polymer, deashing processes can be either omitted or simplified. Further, the pelletizing process on the catalytic component or the polymer also can be omitted.

8 Claims, No Drawings

TITANIUM TRICHLORIDE CATALYTIC COMPONENT AND METHOD FOR HOMO- OR CO-POLYMERIZATION OF α-OLEFIN

BACKGROUND OF THE INVENTION

1. Field of the Invention

This invention relates to a highly active titanium trichloride catalytic component advantageously usable for the manufacture of an α-olefin which has a high degree of stereospecificity. The invention also relates to a method for carrying out homo- or co-polymerization of an α-olefin by which a highly crystalline polymer can be manufactured in the presence of the above stated titanium trichloride catalytic component and an organo-aluminum compound.

More particularly stated, the invention relates to a titanium trichloride catalytic component which is obtained in the following manner: In having the titanium trichloride catalytic component separated out of a solution prepared by dissolving titanium tetrachloride, an organic ether compound and an organo-aluminum compound in a solvent, a mixture solvent consisting of a saturated aliphatic hydrocarbon and/or an alicyclic hydrocarbon with concomitance therein of at least 3% by volume and not exceeding 20% by volume of an aromatic hydrocarbon halide is employed as the solvent either in the presence or absence of an olefin; the organo-aluminum compound, the titanium tetrachloride and the organic ether compound are added at a solvent temperature not exceeding 55° C.; after that the solvent temperature is raised up to 45°–150° C. over a period of 10 minutes to 24 hours; when temporary cooling is performed during the temperature raising process or when the solvent temperature of 45°–80° C. is reached during the temperature raising process, the organic ether compound and/or titanium tetrachloride is further added during the cooling process or at the solvent temperature of 45°–80° C., and, through these processes, a titanium trichloride catalytic component having an average particle diameter between 10 and 500μ is separated from the solution. The invention further relates, as mentioned in the foregoing, to the method for homo- or co-polymerization of an α-olefin in the presence of a catalyst system consisting of the above stated titanium trichloride and an organo-aluminium compound.

2. Description of the Prior Art

A catalytic component for α-olefin polymerization is nowadays required to satisfy the following conditions: It must have a sufficiently high polymerizing property to permit omission of deashing and washing processes for removal of the residue of the catalyst and a non-stereospecific polymer portion from a polymer produced; a high degree of productivity for a stereospecific polymer; and the catalytic component and the polymer product obtained therefrom must have suitable and uniform particle sizes. This is because a catalytic component and a polymer product that are in a powdery state having uneven particle sizes such as those obtained by the conventional method cause difficulty in separating, drying and transporting them. Such products give trouble in industrial operations and result in lower productivity.

It is further desired that the catalytic component is capable of permitting omission of a pelletizing process during the manufacture of an α-olefin polymer.

Heretofore, the operation of α-olefin polymer manufacturing plants using titanium trichloride catalytic components which are obtained through the conventional method has included processes of drying a powdery polymer which is obtained through a polymerization process; melting, milling, extruding and shaping to pelletize the polymer; and supplying the polymer product thus obtained to a molding field. At such an α-olefin polymer manufacturing plant, the pelletizing processes require the largest portion of the total cost of facilities and consume a very large amount of energy. Therefore, in a polymerizing process, if the conventional catalytic component could be replaced with a catalytic component which permits the manufacture of a polymer having highly uniform particle diameter without including any fine particles thereof, it would be possible not only to enhance the operation efficiency of the polymer manufacturing plant but also to obviate the necessity of carrying out the processes of pelletizing the polymer produced. This would save an enormous amount of expenses of facilities and energy and would greatly contribute to the rationalization of the polymer manufacturing operation. Therefore, development of such an ideal catalytic component has been longed for.

Heretofore, a Ziegler-Natta catalyst has been used in general for polymerization of an α-olefin. A typical example of this is a catalyst system obtained by a combination of a δ-type titanium trichloride-aluminum chloride eutectic mixture (hereinafter will be referred to as the δ-type eutectic mixture) with an organo-aluminum compound. The δ-type eutectic mixture is obtained in the following manner: A γ-type titanium trichloride-aluminum chloride eutectic mixture (hereinafter will be referred to as the γ-type eutectic mixture), which is obtained by reducing titanium tetrachloride with aluminum powder in the presence of aluminum chloride, is activated by pulverizing it with a ball mill, a vibration mill or the like. With the δ-type eutectic mixture used as a catalytic component for polymerizing an α-olefin, however, the polymerizing activity and the productivity for a stereospecific polymer are low. Therefore, the δ-type eutectic mixture is not satisfactory. Hence, there have been proposed many reforming methods for improving the δ-type eutectic mixture. Such proposed methods include, for example: (1) A method of pulverizing the γ-type eutectic mixture or the δ-type eutectic mixture together with an improving agent such as an electron donor compound or the like or by allowing the former to react with the latter; (2) a method of washing the γ-type or δ-type eutectic mixture or the pulverized matter of the above stated method (1) with an inert hydrocarbon solvent; and (3) a method of heat treating the γ-type or δ-type eutectic mixture or the matter of the above stated method (1) or (2).

Improvement in the polymerizing activity of the catalytic component and the productivity thereof for a stereospecific polymer has been possible to a certain extent by these methods. However, these methods not only have been entirely unable to freely control the particle diameter of the catalytic component but also have been far from attaining the aim of obviating the necessity of the deashing and washing processes on the polymer produced.

Recently, some catalytic components that have high polymerizing activity and also a high productivity for a stereospecific polymer have been developed. Such recent development include, for example, a method disclosed by a Japanese patent application laid-open No.

47-34478 in which: (1) Titanium tetrachloride is reduced with an organo-aluminum at a low temperature to obtain a β-type titanium trichloride-aluminum chloride eutectic mixture (hereinafter will be referred to as the β-type eutectic mixture); (2) then, a part of the aluminum compound contained in the β-type eutectic mixture is removed by treating the β-type eutectic mixture with a complexing agent; and (3), following that, the β-type eutectic mixture is heat treated in titanium tetrachloride to obtain a δ-type eutectic mixture presenting a dark purple color. Compared with the catalytic component of the δ-type eutectic mixture which is obtained by the above stated pulverization process, the catalytic component obtained by this manufacturing method has polymerizing activity several times as great as that of the former and is an excellent catalytic component. However, this catalytic component has the following shortcomings: (1) A long period of time is required for the manufacture of this catalytic component; (2) a great amount of a washing liquid is required for washing it; (3) there will be produced a great amount of a waste liquid containing titanium and aluminum ions; and (4) accordingly, it necessitates the use of a great amount of a neutralizing agent and, therefore, necessitates some environmental pollution preventing measures and the use of an enormous amount of energy for recovering the solvent used. Therefore, the cost of manufacturing this catalytic component becomes extremely high.

To eliminate the above stated shortcomings, there have been also proposed various methods for manufacturing a catalytic component including: (1) A method in which titanium tetrachloride is treated with an organo-aluminum compound expressed by a generic formula $AlR_nX_{3-n}$ (wherein R represents an alkyl group of carbon number 1-10, X a halogen atom and n a real number of $0<n\leq3$) in the presence of an organic ether compound to obtain a liquid matter; and then the liquid matter is brought into contact with a liberating agent such as Lewis acid or the like at a temperature not exceeding 150° C. to separate therefrom a fine powdery titanium trichloride catalytic component (Japanese patent appln. laid-open No. 51-16298 and 51-76196). (2) A method which is an improvement over the above stated method (1) and does not use the liberating agent (Japanese patent appln. laid-open No. 52-47594). (3) A method which is similar to the above stated method (1) except that a titanium trichloride catalytic component is separated by using a seed crystal (Japanese patent appln. laid-open No. 51-94496). (4) A method similar to the above stated method (1) except that a titanium trichloride catalytic component is separated with the operation temperature changed (Japanese patent appln. laid-open No. 51-90998). These catalytic component manufacturing methods do not require the use of a solvent in great quantity and produce not much waste liquids. However, the average particle diameter of the titanium trichloride component formed is at the most about 30μ and is normally extremely fine measuring several μ or less than that. Besides, since the bulk density of the titanium trichloride catalytic component is low, it is difficult to handle the catalytic component. Further, when an α-olefin is polymerized using this catalytic component, the particle diameter and the bulk density of the polymer produced are small; the productivity for a stereospecific polymer is low; and the polymer must be pelletized because it is in a powdery state.

As mentioned in the foreoging, the α-olefin polymerizing catalytic components manufactured in accordance with the conventional and prior art methods are not satisfactory in various properties. The properties of the olefin polymers obtained through polymerization carried out in the presence of these catalytic components are also not satisfactory. Further improvement of them, therefore, has been desired.

Meanwhile, the present inventors have previously proposed methods for manufacturing titanium trichloride catalytic components as recited by unexamined Japanese patent publication Nos. 54-90094, SHO 55-3456 and SHO 56-8411. The titanium trichloride catalytic component obtained in accordance with each of these methods has a high degree of polymerizing activity and a high rate of producing a stereospecific polymer. The catalytic component also permits control over the particle diameter thereof as desired and eventually permits to control the particle diameter of the olefin polymer to be obtained by the use thereof, so that pelletizing processes can be omitted. The inventors have further conducted studies to better the titanium trichloride catalytic component which is obtainable in accordance with these previously proposed method and which has relatively large particle diameter measuring more than 100μ. The present invention has been completed through these further studies.

SUMMARY OF THE INVENTION

It is an object of the present invention to provide a titanium trichloride catalytic component which is useful for polymerizing an α-olefin and is obtained in the following manner: In having a titanium trichloride catalytic component separate from a solution prepared by dissolving titanium tetrachloride, an organic ether compound and an organo-aluminum compound in a solvent, a mixture solvent consisting of a saturated aliphatic hydrocarbon and/or an alicyclic hydrocarbon with concomitance therein of at least 3% by volume and not exceeding 20% by volume of an aromatic hydrocarbon halide is used as the above stated solvent either in the presence or absence of an olefin; the organo-aluminum compound, the titanium tetrachloride and the organic ether compound are added at a solvent temperature not exceeding 55° C.; after that, the solvent temperature is raised up to 45°-150° C. over a period of 10 minutes to 24 hours; when temporary cooling is performed during the temperature raising process or when the solvent temperature of 45°-80° C. is reached during the temperature raising process the organic ether compound and/or titanium tetrachloride is further added during the cooling period or at the solvent temperature of 45°-80° C. and, through these processes, a titanium trichloride catalytic component having average particle diameter between 10 and 500μ is separated from the solution. The titanium trichloride catalytic component thus separated has highly uniform particle diameter. The average particle diameter of the titanium trichloride catalytic component is adjustable to a value between 10 and 500μ as desired. The catalytic component is highly active and has a high degree of productivity for a stereospecific polymer.

It is another object of the invention to provide a method for homo- or co-polymerization of an α-olefin in the presence of the above stated catalytic component to obtain a highly stereospecific polymer having very uniform particle diameter.

The above stated term "temporary cooling" as used herein means a process of temporarily lowering the solvent temperature down to a value not exceeding 40° C. at a desired point of time during the solvent temperature raising process up to a value between 45° and 150° C., the temporary cooling process being preferably performed when the temperature becomes a value between 45° and 80° C.

In accordance with the present invention, the solvent in which titanium tetrachloride, an organic ether compound and an organo-aluminum compound are to be dissolved must contain a saturated aliphatic hydrocarbon and/or an alicyclic hydrocarbon in combination with an aromatic hydrocarbon halide. Without this arrangement, it is impossible to have the particle diameter of the titanium trichloride catalytic component adjustable as desired. If the solvent uses the saturated aliphatic hydrocarbon and/or the alicyclic hydrocarbon alone without allowing the aromatic hydrocarbon halide or, conversely, if the aromatic hydrocarbon halide is used alone without the saturated aliphatic hydrocarbon and/or the alicyclic hydrocarbon, there would be formed very fine particles of the titanium trichloride catalytic component. With such a fine powdery catalytic component, the objects of the present invention can be hardly attained. Besides, such a catalytic component is hardly usable for polymerization of an α-olefin.

This is a marvellous discovery which has not been dreamed of from the conventional known technology. This invention is quite significant. The titanium trichloride catalytic component obtained in accordance with the invention has a high degree of polymerizing activity and also has a high rate of forming a stereospecific polymer, so that the deashing and washing processes can be omitted or simplified. The titanium trichloride catalytic component and a polymer obtained by the use of the catalytic component have highly uniform particle diameter. Besides the particle diameter is adjustable to a suitable value, so that the properties thereof such as fluidity can be improved to an optimum state for any kinds of plants. Also, it is a significant advantage for industrial applications that, with the particle diameter being adjustable to a desired value, the pelletization processes can be omitted.

The important features of the invention thus include: the average particle diameter of the titanium trichloride catalytic component separated from the solution is adjustable between 10 and 500μ as desired. The particle diameter of the highly active titanium trichloride catalytic component for polymerization of an α-olefin is very uniform. With homo- or co-polymerization of an α-olefin carried out using a catalyst obtained by a combination of the catalytic component and an organo-aluminum compound, a polymer having extremely uniform particle diameter can be obtained. The deashing and washing processes which have been usually considered indispensable in the manufacture of an olefin polymer can be either omitted or simplified. Besides, it is also possible to omit the pelletizing process in the manufacture of an olefin polymer.

The above and further objects and features of the invention will be apparent from the following detailed description thereof.

DETAILED DESCRIPTION OF THE INVENTION

The halogen of the aromatic hydrocarbon halide that can be used in practising the present invention includes chlorine, bromine, iodine and fluorine. The aromatic hydrocarbon halide may be selected out of the following: In case where the aromatic hydrocarbon halide is a chlorinated aromatic hydrocarbon, for example, it may be selected from the group consisting of chloro-benzene, chloro-toluene, chloro-xylene, chloro-ethyl benzene, dichloro-benzene, dichloro-toluene, dichloroxylene, trichloro-benzene, trichloro-toluene, chlorobromo-benzene, etc. In the case of a brominated aromatic hydrocarbon, it may be selected out of the group consisting of bromo-benzene, bromo-toluene, bromoxylene, bromo-ethyl-benzene, dibromo-benzene, dibromo-toluene, dibromo-xylene, tribromo-benzene, tribromo-toluene, etc. The preferable aromatic hydrocarbon halides include chloro-benzene, chloro-toluene, chloro-xylene, dichlorobenzene, dichloro-toluene, dichloro-xylene, bromo-benzene, bromo-toluene, bromoxylene, dibromo-benzene, dibromo-toluene, dibromoxylene, etc.

The saturated aliphatic hydrocarbon to be used in accordance with the invention is preferably a compound having the boiling point thereof at least at 65° C. and may be selected out of the group consisting of n-hexane, n-heptane, n-octane and n-decane. Meanwhile, the alicyclic hydrocarbon usable in accordance with the invention is preferably a compound having the boiling point thereof at 65° C. and above. It may be selected out of the group consisting of cyclo-hexane, cyclo-heptane, cyclo-octane, methyl-cyclo hexane, etc.

In one example of method for adjusting the particle diameter of the titanium trichloride catalytic component, the particle diameter is controlled as desired by adjusting the concentration of the aromatic hydrocarbon halide contained in the solvent consisting of the saturated aliphatic hydrocarbon and/or the alicyclic hydrocarbon with the aromatic hydrocarbon halide included therein (hereinafter will be called the mixed solvent).

The concentration of the aromatic hydrocarbon halide in the mixed solvent is between 3 and 20% by volume, preferably between 5 and 20% by volume and most preferably between 8 and 20% by volume. Within this prescribed range of concentration, the particle diameter of the titanium trichloride catalytic component to be formed becomes smaller according as the concentration of the aromatic hydrocarbon halide increases. Conversely, the particle diameter becomes larger according as the concentration of the aromatic hydrocarbon halide decreases. For example, the particle diameter of the titanium trichloride catalytic component formed is uneven when the concentration is less than 3% by volume. Besides, in this instance, the polymerizing activity of the catalytic component and the stereospecificity of the polymer product to be obtained by the use thereof are degraded to a great degree. On the other hand, when the concentration exceeds 20% by volume, the particle diameter of the catalytic component tends to become so small, depending on the concentration of the titaniumtetrachloride, an organic ether compound and an organoaluminum compound dissolved in the mixed solvent, that the titanium trichloride catalytic component cannot easily be filtered and washed. This then lowers the productivity of the catalytic component.

The titanium tetrachloride is used in quantity not exceeding 7 mol for one liter of the mixed solvent, preferably not exceeding 5 mol and more preferably not exceeding 3 mol. If the quantity of the titanium tetrachloride exceeds 7 mol, the particles of the titanium trichloride catalytic component cannot be easily stirred into a satisfactory suspended state within the mixed solvent when it comes to separate. On the other hand, if the purpose of the manufacture is merely to obtain a titanium trichloride catalytic component without paying any heed to the properties of the titanium trichloride catalytic component to be obtained, it is not necessary to have any particular value set as the lower limit for the quantity of the titanium tetrachloride. It is, however, preferable to use at least 0.01 mol of the titanium tetrachloride in consideration of the productivity. In case where a titanium trichloride catalytic component having average particle diameter of at least 100$\mu$ is to be stably manufactured to attain the object of the present invention, the titanium tetrachloride must be used in quantity at least 0.5 mol for one liter of the mixed solvent, preferably more than 0.8 and more preferably more than 1.5 mol.

The organic ether compound usable in accordance with the invention is a compound expressed by a generic formula of R O R', wherein R and R' represent either the same or different alkyl groups and at least one of R and R' has a carbon number not exceeding 5, said organic ether compound being of carbon number at least 5. The organic ether compound may be selected out of the group consisting of, for example, di-n-amyl ether, di-n-butyl ether, di-n-proyl ether, n-amyl-n-butyl ether, n-amyl-isobutyl ether, n-butyl-n-propyl ether, n-butyl-isoamyl ether, n-propyl-n-hexyl ether, n-butyl-n-octyl ether, etc. Of these, compounds, the use of di-n-butyl ether is most preferable. The quantity of the organic ether compound to be dissolved in the mixed solvent is 0.8 to 3 mol for 1 mol of the titanium tetrachloride and is preferably in the range from 1 to 2.5 mol. When less than 0.8 mol of the organic ether compound is used for 1 mol of the titanium tetrachloride, the polymerizing activity of the titanium trichloride catalytic component formed and the productivity thereof for a stereospecific polymer decrease. Conversely, the use of more than 3 mol of it lowers not only the yield of the catalytic component but also the polymerizing activity and the productivity for a stereospecific polymer.

The organic-aluminum compound usable in accordance with the invention is a compound expressed by a generic formula of AlRnX$_{3-n}$, wherein R represents an alkyl group having a carbon number 1 to 10; X a halogen atom or a hydrogen atom; n a real number of $0 < n \leq 3$. The organoaluminum compound in which n=3, for example, may be selected out of the group consisting of trimethyl aluminum, triethyl aluminum, tri-n-propyl aluminum, tri-n-butyl aluminum, triisobutyl aluminum, tri-n-pentyl aluminum, tri-n-hexyl aluminum, triisohexyl aluminum, tri-n-octyl aluminum, etc. The organo-aluminum compound in which X is a hydrogen atom may be selected out of the group consisting of dimethyl aluminum hydride, methyl aluminum dihydride, diethyl aluminum hydride, ethyl aluminum dihydride, di-n-butyl aluminum hydride, n-butyl aluminum dihydride, diisobutyl aluminum hydride, isobutyl aluminum dihydride, di-n-pentyl aluminum hydride, di-n-hexyl aluminum hydride, diisohexyl aluminum hydride, di-n-octyl aluminum hydride, etc. Further, the compound in which X is a halogen atom may be selected, for example, out of the group consisting of dimethyl aluminum chloride, diethyl aluminum chloride, di-n-propyl aluminum chloride, di-n-butyl aluminum chloride, diisobutyl aluminum chloride, di-n-pentyl aluminum chloride, di-n-hexyl aluminum chloride, diisohexyl aluminum chloride, di-n-octyl aluminum chloride, methyl aluminum sesquichloride, ethyl aluminum sesqui-chloride, n-propyl aluminum sesqui-chloride, n-butyl aluminum dichloride, isobutyl aluminum dichloride, n-hexyl aluminum dichloride, isohexyl aluminum dichloride, etc. It is possible that the organoaluminum compound may be diluted to a suitable extent with the aromatic hydrocarbon halide, the saturated aliphatic hydrocarbon, the alicyclic hydrocarbon or a mixture of them which are to be used in preparing the mixed solvent in accordance with the invention. The organo-aluminum compound is used as reducing agent for the purpose of reducing the tetravalent titanium to a trivalent titanium. Ordinarily, the addition of such an organo-aluminum compound in quantity equivalent of the tetravalent titanium is sufficient for such a purpose. However, in the presence of the aromatic hydrocarbon halide, the addition quantity of the organo-aluminum compound is interrelated with the particle diameter of the separating titanium trichloride catalytic component. In view of this interrelation, it is preferable to set the addition quantity of the organo-aluminum compound within the range from 0.3 to 1.8 equivalent relative to the titanium tetrachloride. When the addition quantity of the organo-aluminum compound is less than 0.3 equivalent relative to the titanium tetrachloride, the yield of the titanium trichloride catalytic component decreases in a great degree. Conversely, the addition of it in excess of 1.8 equivalent lowers the polymerizing activity and the productivity for the stereospecific polymer. Further, within this range, the particle diameter of the catalytic component becomes smaller according as the addition quantity of the organo-aluminum compound increases.

The average particle diameter of the titanium trichloride is also controllable by the quantity of the aromatic hydrocarbon halide, the saturated aliphatic hydrocarbon and the alicyclic hydrocarbon to be used in diluting the organo-aluminum compound. In case where the aromatic hydrocarbon halide is used for diluting the organo-aluminum compound, for example, the average particle diameter of the titanium trichloride catalytic component decreases according as the quantity of the diluent increases.

In another method for adjusting the particle diameter of the titanium trichloride catalytic component, the particle diameter is controlled by adjusting the quantities of the organic ether compound, the titanium tetrachloride and the organo-aluminum compound. However, in that instance, it is also essential to have the aromatic hydrocarbon halide present. Without the presence of the aromatic hydrocarbon halide there, it is hardly possible to adjust the particle diameter of the titanium trichloride catalytic compound as desired. Assuming that the concentrations of the organic ether compound and the titanium tetrachloride are set unvarying, for example, the particle diameter of the titanium trichloride catalytic component to be formed becomes smaller according as the addition quantity of the organo-aluminum compound increases. If the concentrations of the titanium tetrachloride and the organo-aluminum compound are set unvarying, the particle diameter of the catalytic component becomes smaller according as the concentration of the organo-ether compound increases.

As for the organic ether compound which is to be added during the temperature raising process or during the temporary cooling period in the temperature raising process in accordance with the invention, the organic ether compound may be selected out of the same group mentioned in the foregoing. The addition quantity of the organic ether compound to be used for this purpose is less than 4 mol for one mol of the titanium tetrachloride contained in the mixed solvent, preferably less than 3.5 mol and more preferably less than 2.4 mol. Addition quantity of the organic ether compound exceeding 4 mol causes coagulation among particles and this results in formation of a coarse coagulative titanium trichloride catalytic component, which has a lower capability as catalytic component for polymerization of an α-olefin. Although there is no particular lower limit, no salient effect can be expected from addition quantity less than 0.01 mol of the organic ether compound.

In addition to the above stated organic ether compound, titanium tetrachloride may be also added either solely or in combination with the organo-ether compound in the form of a mixture or a complex, during the temperature raising process or during the temporary cooling period in the temperature raising process.

The addition quantity of the titanium tetrachloride to be added during the temperature raising process or during the temporary cooling period in the temperature raising process as mentioned in the foregoing is at least 0.01 mol for 1 mol of the titanium tetrachloride contained in the mixed solvent, preferably more than 0.02 mol and more preferably more than 0.04 mol. Addition quantity less than 0.01 mol of the titanium tetrachloride causes the polymer produced to lack transparency.

The above stated complex consisting of the organic ether compound and the titanium tetrachloride may be selected from the group consisting of titanium tetrachloride - diethyl ether, titanium tetrachloride - di-n-butyl ether, titanium tetrachloride - diisoamyl ether, titanium tetrachloride - isoamyl-n-butyl ether, etc. As for the addition quantity of such a complex or the mixture, it suffices to add the complex or the mixture in quantity corresponding to the quantity of the above stated organic ether compound or the titanium tetrachloride to be used when it is added alone.

The time for adding the organic ether compound, titanium tetrachloride, or the mixture or complex consisting of the organic ether compound and titanium tetrachloride, during the temperature raising process or during the temporary cooling period in the temperature raising process is as follows: After the whole quantity of the organo-aluminum compound is added at a solvent temperature not exceeding 55° C. in the concomitant presence of 3 to 20% by volume of the aromatic hydrocarbon halide in the mixed solvent, the organic ether compound, titanium tetrachloride or the mixture or complex thereof is added at an arbitrary point of time during the process of raising the solvent temperature up to a value between 45° and 150° C. over a period of 10 minutes to 24 hours or particularly at an arbitrary during the period of temporary cooling effected down to a value below 40° C. when the temperature comes to a value between 45° and 150° C., particularly between 45° and 80° C. However, in case where the above stated temporary cooling is not to be carried out, it is preferable to add the organic ether compound alone.

The temporary cooling process may be carried out not only once but may be carried out more than twice. Where the temporary cooling process is to be carried out more than twice, however, the quantity of the organic ether compound and/or titanium tetrachloride must be divided into parts according to the number of times of the process. The ratio of such division, however, can be determined as desired.

Further, in accordance with the present invention, compared with a case where titanium trichloride is allowed to separate in the absence of an olefin, arrangement to allow the titanium trichloride to separate in the presence of an α-olefin gives a titanium trichloride catalytic component which is very strong and consists of smaller particle diameter measuring $\frac{2}{3}$ or $\frac{1}{2}$ of the particle diameter of a titanium trichloride catalytic component obtained with the titanium trichloride allowed to separate in the absence of the olefin. Judging from the fact that the titanium trichloride catalytic component thus obtained has several percent of an olefin polymer contained therein, the reduction in size of the particles and the increase in the strength thereof seem to be attributable to a strong solidifying effect of the polymer in the particles.

Procedures for manufacturing the titanium trichloride catalytic component in accordance with the invention are as shown by way of example below.

After titanium tetrachloride and the organic ether compound are dissolved in the mixed solvent either individually or in the form of a mixture or a complex, the total quantity of the organo-aluminum compound is added. When the organo-aluminum compound is added, the temperature of the mixed solvent must be adjusted to a value not exceeding 55° C., preferably not exceeding 50° C. or more preferably not exceeding 45° C. If the organo-aluminum compound is added at a temperature exceeding 55° C., the titanium tetrachloride would immediately be reduced to have a fine granular titanium trichloride catalytic component come to separate. Then, this not only would make adjustment of the particle size difficult but also would lower productivity because of difficulty in carrying out filtration and washing for the catalytic component.

After the addition of the organo-aluminum compound, the temperature of the mixed solvent is raised up to a value between 45° and 150° C., preferably between 65° and 120° C. or more preferably between 75° and 110° C. The length of time over which the temperature is to be raised up to the specified temperature must be between 10 min and 24 hours, preferably between 30 min and 12 hours or more preferably between 1 and 8 hours, although it also depends on a difference between the temperature before the temperature raising process and the temperature after the process. The purpose of this process is for obtaining a titanium trichloride catalytic component that has highly uniform particle diameter by reducing the titanium tetrachloride with the organo-aluminum compound. If the temperature of the mixed solvent is suddenly raised, say within 10 minutes, the particles of the separating titanium trichloride would be uneven. Conversely, temperature raising over a long period of time exceeding, say, 24 hours would not give any particularly higher effect. On the other hand, when the temperature of the mixed solvent is less than 45° C., the reducing velocity is too slow for attaining a satisfactory degree of productivity. Conversely, the upper limit of the temperature of the mixed solvent must be set at a value below the boiling point of the saturated aliphatic hydrocarbon, the alicyclic hydrocarbon or the aromatic hydrocarbon halide that has the lowest boiling point among these compounds used. Therefore, the temperature is normally raised to a value not exceeding 150° C.

Meanwhile, the organic ether compound and/or the titanium tetrachloride to be added during the temperature raising process must be added when the temperature of the mixed solvent is at an arbitrary value between 45° and 80° C. A catalytic component which is obtained with the organic ether compound added at a mixed solvent temperature not within the above stated range would cause a polymer product to lack transparency and also would make it hardly possible to obtain a polymer having a truly spherical particle shape.

Although it is not particularly specified, the temperature after completion of the temperaure raising process is preferably kept for a period between several minutes and several tens of minutes to allow the reducing reaction to complete.

In adding the organic ether compound and/or the titanium tetrachloride to the mixed solvent during the temporary cooling period, the organic ether compound and/or the titanium tetrachloride must be added at an arbitrary point of time during the period when the solvent temperature is lowered down to a value below 40° C. during the temperature raising process at an arbitrary point between 45° and 150°0 C., particularly 45°–80° C. This operation can be performed more than once in a repeating manner.

The olefin to be used in accordance with the invention may be selected out of olefins of carbon number not exceeding 6. One kind of or more kinds of such olefins may be used. The olefin of carbon number not exceeding 6 may be selected out of the group consisting of, for example, ethylene, propylene, butylene, pentene, hexene, etc., preferably out of the group consisting of ethylene, propylene, butene-1 and isobutylene and more preferably out of ethylene and propylene. Where ethylene or propylene is to be used, a small quantity of hydrogen may be mixed therewith. In supplying the olefin, the olefin is preferably dissolved beforehand in the mixed solvent in which the titanium tetrachloride, the organic ether compound and the organo-aluminum compound are dissolved. However, it is also possible to have the olefin supplied continuously during the process of reaction. The quantity of the olefin used is optional. The particle diameter of the titanium trichloride separating from the mixed solvent becomes smaller according as the quantity of the olefin used increases. Further, it is also possible to have the titanium trichloride catalytic component come to separate under the pressure exerted by the olefin. However, separation under pressure of more than 0.5 atm gives no particular improvement in the effect of the olefin.

The above stated procedures give a novel, truly spherical titanium trichloride catalytic component having highly uniform particle diameter with the average diameter arbitrarily adjustable between 10 and 500$\mu$. The titanium trichloride catalytic component thus obtained is thoroughly washed by an ordinary method with a hydrocarbon solvent or an aromatic hydrocarbon halide solvent and then can be arranged for storage either in a slurry state or in a state of a dry product obtained through filtration and drying processes.

It is a feature of the invented method that a titanium trichloride catalytic component consisting of relatively large particles measuring more than 100$\mu$ in average diameter can be stably produced. In the cases of the previous patent applications filed by the present inventors, unexamined Japanese patent publication Nos. 54-90094 and SHO 55-3456, a slight deviation from the prescribed titanium trichloride catalytic component manufacturing conditions makes it impossible to obtain a titanium trichloride catalytic component of the desired average particle diameter. Whereas, compared with these methods, the method of the present invention gives a titanium trichloride catalytic component of the desired average particle diameter even when there is some deviation from the prescribed manufacturing conditions.

The titanium trichloride catalaytic component which is manufactured through the above stated procedures is used in forming a catalyst for polymerization of an $\alpha$-olefin in combination with an organo-aluminum compound expressed by a generic formula AlRnX$_3$-n, in which R represents an alkyl group, X a halogen atom and n a real number of $0 < n \leq 3$. This organo-aluminum compound may be selected out of the group consisting of triethyl aluminum, diethyl aluminum chloride, ethyl aluminum dichloride, ethyl aluminum sesqui-chloride, triisobutyl aluminum, diisobutyl aluminum chloride, etc.

The ratio of quantity of the titanium trichloride catalytic component to that of the organo-aluminum compound can be set within a wide range by one skilled in the art. However, the ratio is normally set at 1:1–20. Further, an electron donor which is generally used may be used in combination with the catalytic system in carrying out the $\alpha$-olefin polymerizing process of the invention. The polymerization may be carried out by a suspension polymerization process in which an inert hydrocarbon such as an aromatic hydrocarbon selected out of the group consisting of benzene, toluene, xylene, etc., an aliphatic hydrocarbon selected out of the group consisting of heptane, hexane, octane, etc. or an alicyclic hydrocarbon selected out of the group consisting of cyclohexane, cycloheptane, etc. is used as solvent; or by a liquid phase polymerization process in which a liquefied monomer is used as solvent; or by a vapor phase polymerization process in which a monomer is used in a gaseous phase. As for the mode of polymerization, the polymerizing operation can be carried out either in a continuous operation mode or in a batch operation mode. The polymerization temperature is set at a temperature between 30° and 120° C. and preferably at a temperature between 50° and 100° C. The polymerization pressure is set at a value between the atmospheric pressure and 100 atm and preferably at a value between the atmospheric pressure and 50 atm.

The $\alpha$-olefin to be homo- or co-polymerized with the catalytic system of the present invention used include ethylene, propylene, butene-1, 4-methyl pentene-1, etc. The molecular weight of the polymer is adjustable by a conventional known method carried out with hydrogen or diethyl zinc used.

When the titanium trichloride catalytic component is used in polymerizing an $\alpha$-olefin in accordance with the polymerizing method of the invention, the polymerizing activity of the catalytic component is extremely high and the polymer thus obtained also has a high degree of stereospecificity and a high bulk density. With the particle size of the titanium trichloride cataytic component adjusted, it is possible to obtain a polymer having highly uniform particle diameter measuring within the range from 0.5 to 15 mm. The polymer thus obtained has an almost truly spherical particle shape with transparency and the excellent fluidity. Despite of such a large particle diameter, the polymer thus obtained has an excellent deashing property.

The following examples are exemplary of the invention. However, these examples are intended to illustrate the invention and are not to be construed to limit the scope of the invention. In these examples and comparison examples which are also given hereinafter, there are used symbols the definition of which is as shown below.

a: The number of g of the polymer produced (g-pp, g-pp/g-cat-hr-atm) in unit time (hr) at unit pressure (atm), and per g of the catalytic component (g-cat.) used.

p: The number of g of the polymer produced (g-pp/g-cat.) per g of the catalytic component.

$$HI: \frac{\text{Boiling n-heptane insoluble matter (g) in solid polymer produced}}{\text{Solid polymer produced (g)}} \times 100(\%)$$

$$II: \frac{\text{Solid polymer produced (g)} \times HI}{\text{Produced solid polymer (g)} + \text{Polymer (g) soluble in Polymerizing solvent}} (\%)$$

Dc: The average particle diameters ($\mu$) of the titanium trichloride catalytic component and the polymer obtained by measuring the diameters of 50 particles with a microscope and then by averaging the measured values.

$\rho$: The bulk density of the produced solid polymer (g/ml) as measured in accordance with the ASTM-D-1895-69 method A or B.

Dp: The geometric average particle diameter ($\mu$) of the produced polymer in a logarithmic probability distribution formula.

EXAMPLE 1

The inside of a 500 ml, four-necked flask equipped with a stirrer was replaced with dry nitrogen. Then, 170 ml of a monochloro benzene-n-hexane mixed solvent containing 11.8% by volume of monochloro benzene which was used as aromatic hydrocarbon halide was introduced into the flask. Following that, 24.2 ml of titanium tetrachloride was added. The solution of the mixed solvent was kept at 20°–23° C. with stirring. Under this condition, 50.6 ml of di-n-butyl ether was dropped over a period of 10 minutes. After that, a solution prepared by dissolving 18.8 ml of diethyl aluminum chloride in 60 ml of monochloro benzene was dropped over a period of 40 minutes. Then, the temperature of the mixture solution thus obtained was raised up to 60° C. over a period of 90 minutes by heating. The heating process was stopped when the temperature of 60° C. was reached and at the same time the temperature of the solution was cooled down to 20° C. Then, 25.3 ml of di-n-butyl ether and 9 ml of titanium tetrachloride were added and mixed with thorough stirring.

The mixture solution was then heated up to 78° C. over a period of 90 minutes and was kept at that temperature for 40 minutes. Following this, a separating matter thus obtained was filtrated in a dry nitrogen atmosphere to obtain a cake. The cake was washed five times with 150 ml of n-hexane. The washed cake was dried at room temperature under reduced pressure to obtain 41 g of a titanium trichloride catalytic component having highly uniform particle diameter measuring 350$\mu$ on the average. The titanium trichloride catalytic component thus obtained was analyzed. The results of analysis indicated that the catalytic component contained 25.5% by weight of Ti, 60.2% by weight of Cl, 0.23% by weight of Al and 9.5% by weight of di-n-butyl ether. The specific surface area of the catalytic component was measured by the BET method to find that it was 87 m$^2$/g.

The Polymerization Method: The inside of a dried polymerization flask which was of 1 liter content volume, equipped with a side arm and had been prepared with moisture completely removed therefrom was replaced with dry nitrogen. To this were supplied 400 ml of n-heptane, 110 ml of the above stated titanium trichloride catalytic component and 1.6 mmol of diethyl aluminum chloride. Following that, the nitrogen of the inside of this polymerization flask was replaced with propylene. Then, while the inner pressure of the flask was kept at 2 kg/cm$^2$G with propylene gas, polymerization of propylene was carried out over a period of 2.5 hours.

Upon completion of polymerization, stirring and introducting of propylene were stopped. Unreacted propylene was purged from the flask. After that, 100 ml of an alcohol mixture consisting of methanol and isopropanol in the ration of 3:1 was placed in the flask to have the catalyst decomposed thereby.

A solid polymer thus formed was taken out by filtration. The solid polymer was washed and dried to obtain 44.5 g of polypropylene. Meanwhile, the filtrate was evaporated to dryness to recover 1.5 g of polypropylene which had been dissolged in the polymerization solvent. The results of polymerization were as shown in Table 1.

EXAMPLE 2

The preparation of a titanium trichloride catalytic component and polymerization of propylene were carried out in exactly the same manner as in Example 1 with the exception of that: The temporary cooling process was performed twice. During each period of the temporary cooling process, 12.7 ml of di-n-butyl ether and 4.5 ml of titanium tetrachloride were added. The results of Example 2 were as shown in Table 1.

EXAMPLE 3

The preparation of a titanium trichloride catalytic component and polymerization of propylene were carried out in exactly the same manner as in Example 1 with the exception of that: The temporary cooling process described in Example 1 was performed three times. During each period of the temporary cooling process, 8.4 m of di-n-butyl ether and 3 ml of titanium tetrachloride were added. The results of Example 3 were as shown in Table 1.

EXAMPLE 4

The preparation of a titanium trichloride catalytic component and polymerization of propylene were carried out in exactly the same maner as in Example 1 with the exception of that: The temporary cooling process described in Example 1 was performed four times. During each period of the temporary cooling process, 6.3 ml of di-n-butyl ether and 2.5 ml of titanium tetrachloride were added to obtain results as shown in Table 1.

EXAMPLE 5

Using a four-necked flask of 500 ml equipped with a stirrer, the inside of the flask was replaced with dry nitrogen. Then, 170 ml of a monochloro benzene-n-hexane mixed solvent having 11.8% by volume of monochloro benzene mixed therein as aromatic hydrocarbon halide was introduced into the flask. Following that, 24.2 ml of titanium tetrachloride was added. While the mixed solvent was kept at 20° to 23° C. with stirring, 50.6 ml of di-n-butyl ether was dropped there over a period of 10 minutes. Then, after that, a solution prepared by dissolving 18.8 ml of diethyl aluminum chloride in 60 ml of monochloro benzene was also dropped over a period of 40 minutes. After completion of this dropping, the mixed solvent solution was heated up to 80° C. over a period of 2.5 hours and was then kept at that temperature for 60 minutes. Immediately after that, a separating matter thus obtained was filtered in a dry nitrogen atmosphere to obtain a cake thereof. The cake was washed twice with 100 ml of monochloro benzene and three times with 150 ml of n-hexane.

The washed cake was dried at room temperature under reduced pressure to obtain 40.5 g of a titanium trichloride catalytic component having highly uniform particle diameter measuring 440μ on the average. This titanium trichloride catalytic component was used for polymerization of propylene, which was carried out in exactly the same manner as in Example 1. The results of this were as shown in Table 1.

EXAMPLE 6

The preparation of a titanium trichloride catalytic component and polymerization of propylene were carried out in exactly the same manner as in Example 1 with the exception of that: The nitrogen atmosphere used in Example 1 was replaced with a propylene atmosphere in this case. The results thus obtained were as shown in Table 1.

TABLE 1

| Example No. | Results of polymerization | | | | |
|---|---|---|---|---|---|
| | Dc | a | II | Dp | ρ |
| 1 | 350 | 75 | 94.8 | 2300 | 0.45 |
| 2 | 340 | 79 | 95.3 | 2300 | 0.45 |
| 3 | 350 | 81 | 95.5 | 2400 | 0.46 |
| 4 | 350 | 81 | 95.7 | 2400 | 0.45 |
| 5 | 440 | 49 | 89.5 | 3100 | 0.30 |
| 6 | 180 | 84 | 96.2 | 1600 | 0.46 |

EXAMPLES 7–20

The preparation of a titanium trichloride catalytic component and polymerization of propylene were carried out in each of Examples 7–20 in exactly the same manner as in Example 1 with the exception of that: The kind, mixing ratio and using quantity of the mixed solvent, the quantity of di-n-butyl ether and the quantity of diethyl aluminum chloride diluting monochloro benzene are arranged to be as shown in Table 2. The results of these examples were as shown also in Table 2.

COMPARISON EXAMPLE 1

A titanium trichloride catalytic component was prepared in exactly the same manner as in Example 1 with the exception of that 170 ml of n-hexane was used in place of the mixed solvent. Then, during the temperature raising process, a separating matter solidified and was found not usable as catalytic component for polymerization of propylene.

COMPARISON EXAMPLE 2

A titanium trichloride catalytic component was prepared in exactly the same manner as in Example 1 with the exception of that 170 ml of monochloro benzene was used in place of the mixed solvent. Then, when filtration was carried out with a glass filter, the whole of a separating titanium trichloride catalytic component thus formed passed through the filter. The separated titanium trichloride catalytic component was observed with a microscope to find that it consists of particles measuring about 1 to 3μ in diameter.

EXAMPLES 21–24

The preparation of a titanium trichloride catalytic component and polymerization of propylene were carried out in exactly the same manner as in Example 1 with the exception of that the organic ether compound and the organo-aluminum compound were used under the conditions as shown in Table 3. The results of these examples were as shown in Table 3.

EXAMPLE 25

The inside of a 500 ml, four-necked flask equipped with a stirrer was placed with dry nitrogen. Then, 170 ml of a monochloro benzene—n-hexane mixed solvent containing 11.8% by volume of monochloro benzene as aromatic hydrocarbon halide was introduced into the flask. Following that, 24.2 ml of titanium tetrachloride was added. While the mixed solvent solution was kept at 20° to 23° C. with stirring, 50.6 ml of di-n-butyl ether was dropped over a period of 10 minutes. After that, a solution prepared by dissolving 18.8 ml of diethyl aluminum chloride in 60 ml of monochloro benzene was also dropped over a period of 40 minutes. After completion of this dropping, the mixture solution was heated to raise its temperature at a rate of about 0.3° C. per minute. When the temperature of the mixture solution reached 60° C., 6.7 ml of di-n-butyl ether was added with thorough stirring and mixing.

Heating was further applied until the temperature of the mixture solution reached 78° C. and then the solution was kept at that temperature for 40 minutes. After that, a separating matter was filtrated in a dry nitrogen atmosphere to obtain a cake thereof. The cake was washed five times with 150 ml of n-hexane.

A titanium trichloride catalytic component which was obtained through the above stated processes was used for polymerization of propylene, which was carried out in exactly the same manner as in Example 1 to obtain the following results:

Dc=360; a=73; II=923; Dp=250; ρ=0.43

TABLE 2

| | Preparation of catalytic component | | | | | | | |
|---|---|---|---|---|---|---|---|---|
| Example No. | Mixing ratio and used qty (ml) of mixed solvent | Qty of di-n-butyl ether, mol | Qty of DEAC* diluting monochloro-benzene, ml | Results of polymerization | | | | |
| | | | | Dc | a | II | Dp | ρ |
| 7 | Monochloro-benzene:hexane (1:7.5)   170 ml | 0.30 | 70 | 230 | 77 | 93.2 | 1,900 | 0.46 |
| 8 | Monochloro-benzene:hexane (1:7.5)   170 ml | " | 75 | 200 | 78 | 93.4 | 1,600 | 0.46 |
| 9 | Monochloro-benzene:hexane (1:7.5)   170 ml | 0.30 | 80 | 180 | 78 | 93.5 | 1,500 | 0.47 |
| 10 | Monochloro-benzene:hexane | 0.30 | 70 | 120 | 77 | 93.9 | 1,100 | 0.48 |

TABLE 2-continued

| Example No. | Mixing ratio and used qty (ml) of mixed solvent | Qty of di-n-butyl ether, mol | Qty of DEAC* diluting monochloro-benzene, ml | Dc | a | II | Dp | p |
|---|---|---|---|---|---|---|---|---|
| | (1:6.5)   120 ml | | | | | | | |
| 11 | Monochloro-benzene:hexane (1:6.5)   150 ml | 0.31 | 60 | 80 | 87 | 93.7 | 920 | 0.46 |
| 12 | Monochloro-benzene:hexane (1:6.5)   200 ml | 0.32 | " | 10 | 88 | 94.1 | 80 | 0.39 |
| 13 | Monochloro-benzene:hexane (1:6.5)   150 ml | 0.30 | " | 110 | 83 | 93.5 | 980 | 0.45 |
| 14 | Ortho-chloro toluene:hexane (1:7.5)   170 ml | " | " | 350 | 65 | 93.1 | 2,200 | 0.41 |
| 15 | Para-chloro toluene:hexane (1:7.5)   170 ml | " | " | 330 | 68 | 93.5 | 2,100 | 0.42 |
| 16 | Bromo toluene:hexane (1:7.5)   170 ml | " | " | 300 | 64 | 93.0 | 1,900 | 0.42 |
| 17 | Monochloro-benzene:hexane (1:6.5)   170 ml | " | " | 340 | 71 | 93.2 | 2,200 | 0.45 |
| 18 | Monochloro-benzene:cyclohexane (1:7.5)   170 ml | 0.30 | " | 350 | 65 | 93.0 | 2,200 | 0.42 |
| 19 | Monochloro-benzene:hexane (1:1.1)   110 ml | 0.29 | " | 420 | 62 | 92.8 | 2,900 | 0.42 |
| 20 | Monochloro-benzene:hexane (3:1.3)   160 ml | 0.32 | " | 10 | 85 | 94.0 | 80 | 0.40 |

Note:
*Diethyl aluminum chloride

TABLE 3

| Example No. | Organic ether compound | Organo-aluminum compound | Dc | a | II | Dp | p |
|---|---|---|---|---|---|---|---|
| 21 | di-n-propyl ether 0.31 mol | DEAC | 120 | 60 | 92.5 | 950 | 0.40 |
| 22 | di-n-amyl ether 0.31 mol | " | 130 | 65 | 93.0 | 1000 | 0.41 |
| 23 | di-n-butyl ether | DIBAC*1 0.15 mol | 320 | 78 | 93.6 | 2100 | 0.45 |
| 24 | " | DNPRAC*2 0.15 mol | 300 | 80 | 94.0 | 2000 | 0.45 |

Notes:
*1Diisobutyl aluminum chloride
*2Di-n-propyl aluminum chloride

What is claimed is:

1. A titanium trichloride catalytic component for polymerization of α-olefin, said catalytic component being obtained by separating it from a solution prepared by dissolving titanium tetrachloride, an organic ether compound having the formula ROR' wherein R and R' are the same or different alkyl groups, at least one of R and R' being an alkyl group having not more than 5 carbons, said organic ether compound having at least 5 carbons and an organo-aluminum compound having the formula $AlR_nX_{3-n}$ wherein R is an alkyl group having 1-10 carbons, X is halogen or hydrogen and n is an integer of $0 < n \leq 3$, in a mixed solvent consisting of (a) a saturated aliphatic hydrocarbon and/or an alicyclic hydrocarbon; and (b) at least 3% by volume and not more than 20% by volume of a halogenated aromatic hydrocarbon, said mixed solvent being used either in the presence of, or in the absence of, an olefin, and said organo-aluminum compound, adding said titanium tetrachloride and said organic ether compound to the mixed solvent at a solvent temperature not exceeding 55° C. and then raising the solvent temperature to between 45° and 150° C. over a period of 10 minutes to 24 hours and, during this temperature raising process, said organic ether compound and/or titanium tetrachloride may be further added, the concentration of titanium tetrachloride in the mixed solvent being at least 0.5 mol per liter, whereby titanium trichloride catalytic component of average particle diameter measuring 10 to 500μ separates from said solution.

2. A titanium trichloride catalytic component for polymerization of an α-olefin according to claim 1, wherein said olefin is an unsaturated aliphatic hydrocarbon of carbon number not exceeding 6.

3. A titanium trichloride catalytic component according to claim 1 or 2 said halogenated aromatic hydrocarbon is a chlorinated aromatic hydrocarbon and/or a brominated aromatic hydrocarbon.

4. A titanium trichloride catalytic component according to any one of claims 1 or 2 wherein components to be dissolved in said mixed solvent include less than 7 mol of the titanium tetrachloride for one liter of said mixed solvent; 0.8 to 3 mol of the organic ether compound for one mol of said titanium tetrachloride; and 0.3 to 1.8 equivalent of the organo-aluminum compound relative to said titanium tetrachloride.

5. A titanium trichloride catalytic component according to any one of claims 1 or 2 said organic ether compound added during said temperature raising process is used in quantity not exceeding 4 mol for 1 mol of said titanium tetrachloride contained in said mixed solvent.

6. A titanium trichloride catalytic component according to any one of claims 1 or 2 wherein said titanium tetrachloride added during said temperature raising process is used in quantity at least 0.01 mol for 1 mol of the titanium tetrachloride contained in said mixed solvent.

7. A titanium trichloride catalytic component according to any one of claims 1 or 2 wherein said organic ether compound and/or said titanium tetrachloride added during said temperature raising process is added at a temperature within a temperature range from 45° to 85° C.

8. A titanium trichloride catalytic component according to any one of claims 1 or 2 wherein temporary cooling is carried out during said temperature raising process and said organic ether compound and/or said titanium tetrachloride which is added during said temperature raising process is added during the period of said temporary cooling.

* * * * *